United States Patent [19]

Onodera et al.

[11] Patent Number: 5,060,128
[45] Date of Patent: Oct. 22, 1991

[54] FLYBACK POWER SUPPLY

[75] Inventors: Shunji Onodera, Iwai; Shinichi Ito, Kashiwa, both of Japan

[73] Assignee: Victor Company of Japan, Ltd., Yokohama, Japan

[21] Appl. No.: 501,464

[22] Filed: Mar. 30, 1990

[30] Foreign Application Priority Data

Mar. 31, 1989 [JP] Japan .................................. 1-83753

[51] Int. Cl.⁵ ............................................. H02M 7/06
[52] U.S. Cl. ...................................... 363/20; 363/68; 336/185
[58] Field of Search ........................... 363/20, 21, 68; 336/185; 358/190; 315/411

[56] References Cited

U.S. PATENT DOCUMENTS

| | | | |
|---|---|---|---|
| 3,886,434 | 5/1975 | Schreiner | 363/68 |
| 3,904,928 | 9/1975 | Sawada et al. | 336/185 |
| 4,204,263 | 5/1980 | Onoue | 363/68 |
| 4,639,663 | 1/1987 | Ueno et al. | 363/20 |

FOREIGN PATENT DOCUMENTS

| | | |
|---|---|---|
| 59-43910 | 10/1984 | Japan . |
| 61-22847 | 6/1986 | Japan . |
| 61-212008 | 9/1986 | Japan . |
| 62-104416 | 7/1987 | Japan . |
| 62-104417 | 7/1987 | Japan . |

Primary Examiner—Peter S. Wong
Attorney, Agent, or Firm—Lowe, Price, LeBlanc & Becker

[57] ABSTRACT

A flyback power supply for use with a cathode-ray tube includes a flyback transformer which comprises a core having two spaced core legs, and two core units supported respectively on the core legs. Each of the coil units includes a low-voltage coil bobbin fitted over one of the core legs, a low-voltage coil wound around the low voltage coil bobbin, a high-voltage coil bobbin disposed around the low-voltage coil bobbin, and a high-voltage coil which comprises a plurality of coil layers wound successively around the high-voltage coil bobbin with insulating layers interposed between the coil layers, the low-voltage coils of the coil units being connected parallel to each other. Diodes are connected in series with the coil layers, respectively of the high-voltage coil of each of the coil units such that voltages produced across the coil layers will be in phase with each other. The high-voltage coils of the coil units are connected in series with each other, whereby voltages produced across the high-voltage coils are added and rectified.

5 Claims, 6 Drawing Sheets

FLYBACK POWER SUPPLY

BACKGROUND OF THE INVENTION

1. Field of the Invention:

The present invention relates to a flyback transformer, and more particularly to a flyback power supply which applies a high voltage to the anode of a cathode-ray tube for use in a television receiver, a cathode-ray tube display, or the like.

2. Prior art:

Cathode-ray tubes (CRTs) used in television receivers and display terminals require a very high anode voltage in their operation. These television receivers and display terminals are equipped with flyback power supplies for boosting and rectifying flyback pulses to produce such a very high anode voltage.

Recent color television receivers with CRTs are required to be compatible with various pieces of audio and video equipment, to receive multiplex broadcasts such as character display programs, and to have larger screens. Display terminals with CRTs are also required to have larger screens and higher image resolution. To meet these requirements, flyback transformers or power supplies used with those CRTs should produce a high output voltage and a high output current and have as small high-voltage fluctuations, ringing, and undesired radiation as possible. The flyback power supplies should also be inexpensive so that they can be employed in general-purpose television receivers.

Conventional flyback transformers include a high-voltage coil composed of successive coil layers. Since the high-voltage coil has a large diameter, its outer coil layers are less magnetically coupled to the low-voltage coil, resulting in an increase in their leakage inductance and a reduction in their resonant frequency. The conventional flyback transformers have therefore been poor in high-voltage regulation.

Japanese Laid-Open Utility Model Publications Nos. 62(1987)-104416 and 62(1987)-104417 disclose flyback transformers with improved regulation. The disclosed flyback transformers include two high-voltage coil units mounted on a single core leg. These flyback transformers are however relatively long and their core legs are also long. The long flyback transformers cannot easily be mounted in place in television receivers and display terminals since modern television receivers and display terminals employ relatively small casings. The long core legs are also disadvantageous in that they tend to warp and have reduced mechanical strength, and are costly to manufacture.

SUMMARY OF THE INVENTION

It is an object of the present invention to provide a flyback power supply which has better high-voltage regulation and is substantially free of ringing.

Another object of the present invention is to provide a flyback power supply which can easily be manufactured relatively inexpensively and is reliable in operation.

Still another object of the present invention is to provide a flyback power supply which is subject to a reduced temperature rise and can produce increased output power.

According to the present invention, there is provided a flyback power supply which includes a flyback transformer comprising a core having a plurality of core legs spaced from each other, and a plurality of coil units supported respectively on the core legs. Each of the coil units includes a low-voltage coil bobbin fitted over one of the core legs, a low-voltage coil wound around the low-voltage coil bobbin, a high-voltage coil bobbin disposed around the low-voltage coil bobbin, and a high-voltage coil which comprises a plurality of coil layers wound successively around the high-voltage coil bobbin with insulating layers interposed between the coil layers, the low-voltage coils of the coil units being connected parallel to each other. The flyback power supply also comprises a plurality of first diodes connected in series with the coil layers, respectively, of the high-voltage coil of each of the coil units such that voltages produced across the coil layers will be in phase with each other, and a second diode by which the high-voltage coils of the coil units being connected in series with each other, whereby voltages produced across the high-voltage coils are added and rectified.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
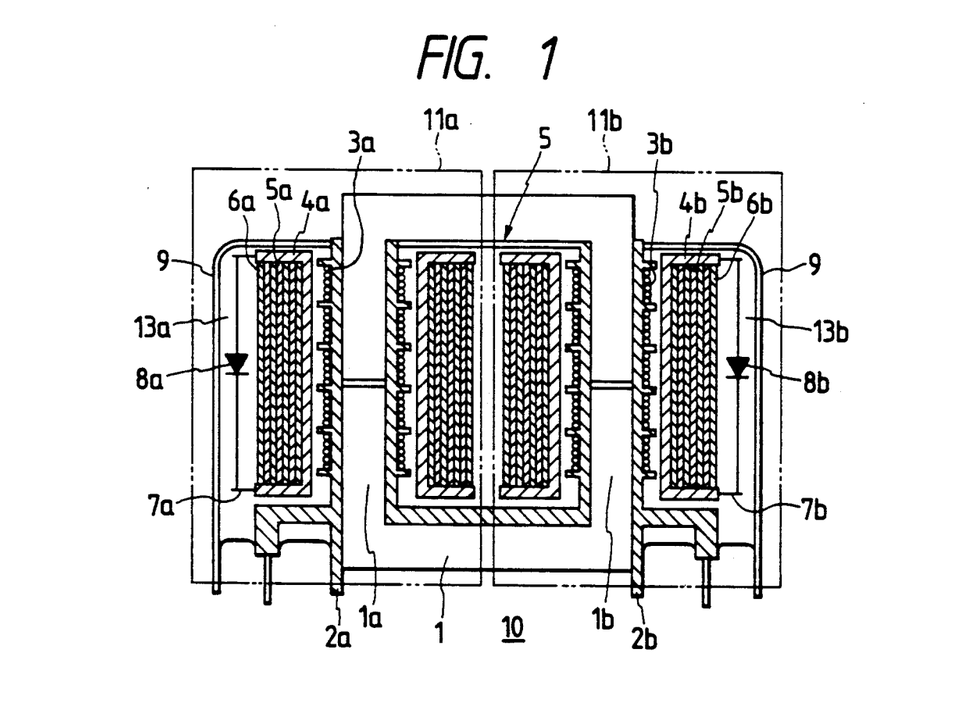
FIG. 1 is a cross-sectional view of a flyback power supply according to a first embodiment of the present invention.
Figure 2:
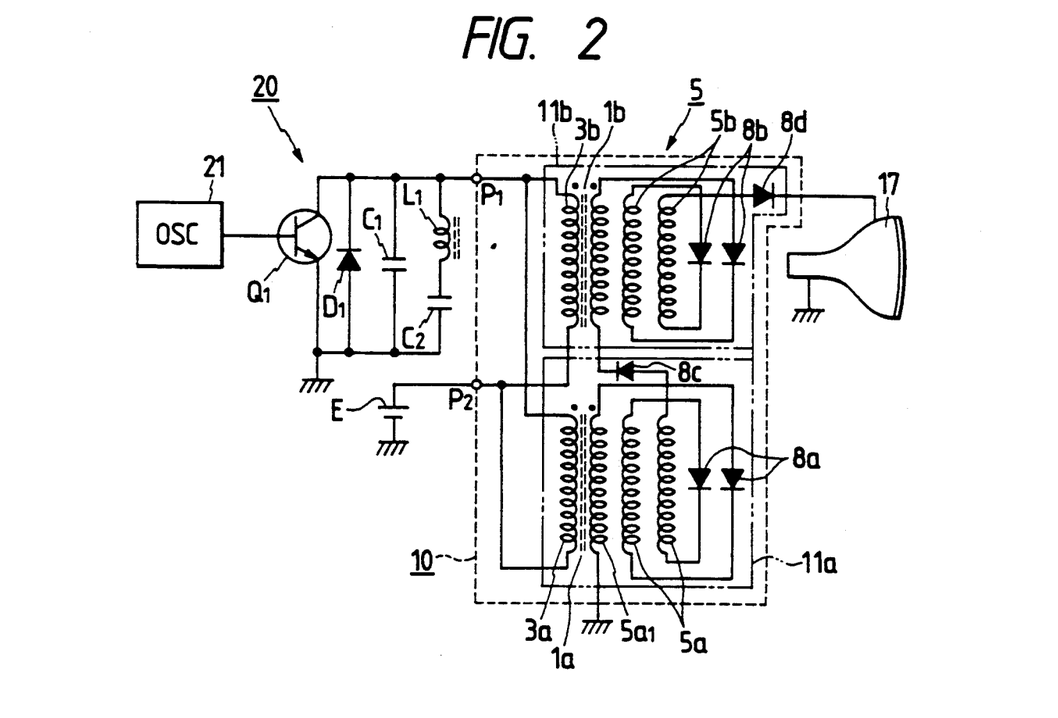
FIG. 2 is a circuit diagram of the flyback power supply shown in FIG. 1 and other circuits connected to the flyback power supply.

FIGS. 1 and 2 show the structure and circuit arrangement, respectively, of a flyback power supply according to a first embodiment of the present invention.

As shown in FIG. 2, the flyback power supply includes a flyback transformer which comprises a core 1 as of ferrite having a pair of laterally spaced, parallel core legs 1a, 1b, a pair of low-voltage coil bobbins 2a, 2b fitted over the core legs 1a, 1b, respectively, a pair of low-voltage coils or primary windings 3a, 3b wound around the low-voltage coil bobbins 2a, 2b, respectively, a pair of high-voltage coil bobbins 4a, 4b disposed around the low-voltage coil bobbins 2a, 2b, a high-voltage coil assembly 5 including a pair of high-voltage coils or windings which have coil layers 5a, 5b wound around the high-voltage coil bobbins 4a, 4b, a plurality of interlayer insulating layers 6a, 6b as of polyester film which are interposed between the high-voltage coils layers 5a, 5b, and terminals 7a, 7b mounted on the high-voltage coil bobbins 4a, 4b and connected to starting and terminal ends of the high-voltage coil layers 5a, 5b. The flyback power supply also includes a plurality of diodes 8a, 8b connected to the terminals 7a, 7b. The low-voltage coils 3a, 3b and the high-voltage coil layers 5a, 5b are housed in a casing 9 in which the coils and the diodes are encased in insulating resin bodies 13a, 13b such as epoxy resin bodies for electrical insulation. The low-voltage coils 3a, 3b are wound as cylindrical coils around the low-voltage coil bobbins 2a, 2b. The high-voltage coil layers 5a, 5b are in the form of aligned solenoid-shaped coil layers disposed successively around the low-voltage coils 3a, 3b, with the insulating layers 6a, 6b interleaved between the high-voltage coil layers.

The diodes 8a, 8b have cathodes connected to the terminals 7a, 7b and are connected in series with the high-voltage coil layers 5a, 5b so that voltages generated across the high-voltage coil layers 5a, 5b are in phase with each other.

The low-voltage coils 3a, 3b and the high-voltage coil layers 5a, 5b which are housed in the casing 9 serve as a pair of first and second coil units 11a, 11b, respectively. The first coil unit 1a is disposed around the coil leg 1a, whereas the second coil unit 11b is disposed around the coil leg 1b. As shown in FIG. 2, the low-voltage coil 3a of the first coil unit 11a is connected parallel to the low-voltage coil 3b of the second coil unit 11b. The high-voltage coil layers 5a of the first coil unit 11a are connected in series to the high-voltage coil layers 5b of the second coil unit 11b. The first and second coil units 11a, 11b may not necessarily be identical in structure to each other, but may be different from each other. For example, the low-voltage coils 3a, 3b may have different numbers of turns, the first and second coil units 11a, 11b may produce different voltages, and the high-voltage coils may have different numbers of turns and layers.

As shown in FIG. 2, the low-voltage coils 3a, 3b have ends connected to a horizontal output circuit 20 through a terminal p1. The horizontal output circuit 20 comprises an NPN horizontal output transistor Q1, a damper diode D1, a resonant capacitor C1, a horizontal deflection coil L1 of a deflection yoke (not shown), and an S-shaping capacitor C2. The transistor Q1 has a collector coupled to the terminal p1, an emitter connected to ground, and a base connected to an oscillator 21 which applies pulses to the transistor Q1. A DC voltage is applied from a DC power supply E through a terminal p2 to the other ends of the low-voltage coils 3a, 3b. The low-voltage coils 3a, 3b are connected parallel to each other between the terminals p1, p2.

As shown in FIG. 2, the high-voltage coils of the first and second coil units 11a, 11b are connected in series with each other through a diode 8c. The high-voltage coil of the second coil unit 11b has its output terminal coupled through a diode 8d to a CRT 17. The high-voltage coil of the first coil unit 11a has its input terminal grounded.

It is known that the layers of a high-voltage coil which is wound around a low-voltage coil are progressively greater in diameter and less inductively coupled to the low-voltage coil in a radially outward direction (i.e., away from the low-voltage coil). As a result, the leakage inductance is greater and the resonant frequency is lower with those high-voltage coil layers which are positioned more radially outwardly or away from the low-voltage coil. In the flyback transformer of the flyback power supply according to the present invention, as shown in FIG. 1, the high-voltage coil assembly 5 is divided into the two high-voltage coils disposed respectively around the low-voltage coils 3a, 3b and connected in series with each other through the diode 8c. Therefore, the diameter of each of the high-voltage coils is smaller and the resonant frequency thereof is higher than would be if a single high-voltage coil of the same output requirement were employed.

An experiment was conducted on an inventive flyback power supply whose flyback transformer has two high-voltage coils each having three layers and a comparative flyback power supply whose flyback transformer has a single high-voltage coil having six layers. The resonant frequencies of the inventive and comparative flyback transformers were 835 kHz and 720 kHz, respectively. The resonant frequency of the inventive flyback transformer was about 16% higher than that of the comparative flyback transformer, and the high-voltage regulation of the inventive flyback transformer was about 36% higher than that of the comparative flyback transformer.

Various other flyback power supplies according to second through eighth embodiments of the present invention will be described below with reference to FIGS. 3 through 9.

FIGS. 3 through 9 illustrate circuit arrangements of these other flyback power supplies. The structural details of the flyback power supplies shown in FIGS. 3 through 9 are essentially the same as those of the flyback power supply shown in FIG. 1.

Figure 3:
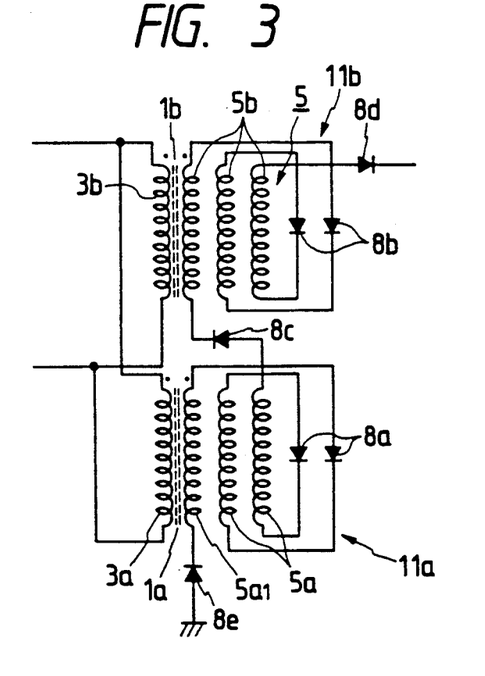
FIGS. 3 through 9 are circuit diagrams of flyback power supplies according to second through eighth embodiments of the present invention.

The flyback power supply according to the second embodiment shown in FIG. 3 differs from the flyback power supply shown in FIG. 2 in that a diode 8e is connected to the input terminal of the innermost coil layer 5a1 of the high-voltage coil of the first coil unit 11a, the diode 8e being connected forwardly with respect to the diodes 8a. With this arrangement, the innermost coil layer 5a1 is isolated from ground (at a zero potential) with respect to alternating currents, so that the high-voltage coil assembly 5 can resonate at higher frequencies.

Figure 4:
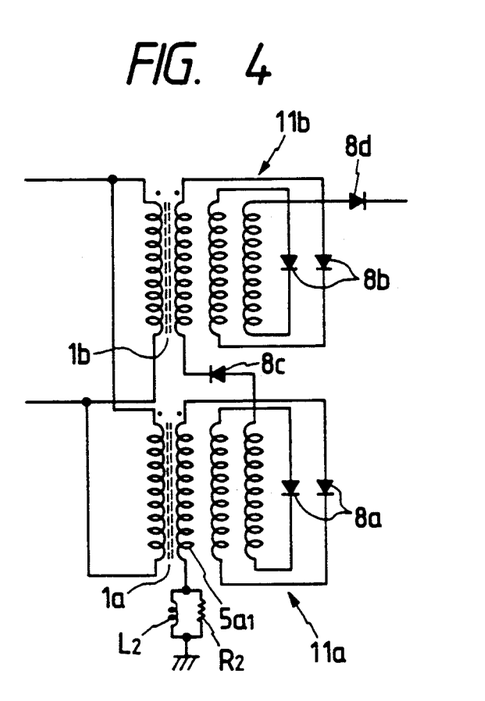

According to the third embodiment shown in FIG. 4, the flyback power supply includes, in addition to the circuit arrangement shown in FIG. 3, a parallel-connected circuit of a resistor R2 (which may have a resistance of 8.2 kΩ, for example) and an inductive element L2 (which may have an inductance of 2.7 mH, for example), the parallel-connected circuit being coupled in series coupled in series to the input terminal of the innermost coil layer 5a1 of the high-voltage coil of the first coil unit 11a. The parallel-connected circuit is effective to reduce ringing in a waveform induced in the first coil unit 11a.

Figure 5:
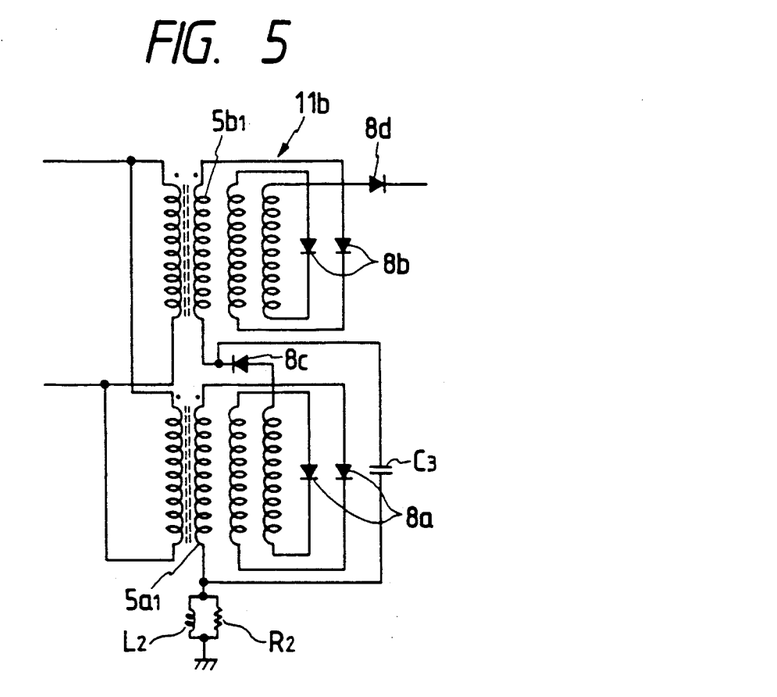

The flyback power supply according to the fourth embodiment shown in FIG. 5 includes, in addition to the circuit arrangement shown in FIG. 4, a capacitor C3 (which may have a capacitance of 470 pF, for example) connected between the input terminals of the innermost coil layers 5a1, 5b1 of the high-voltage coils of the first and second coil units 11a, 11b.

Figure 6:
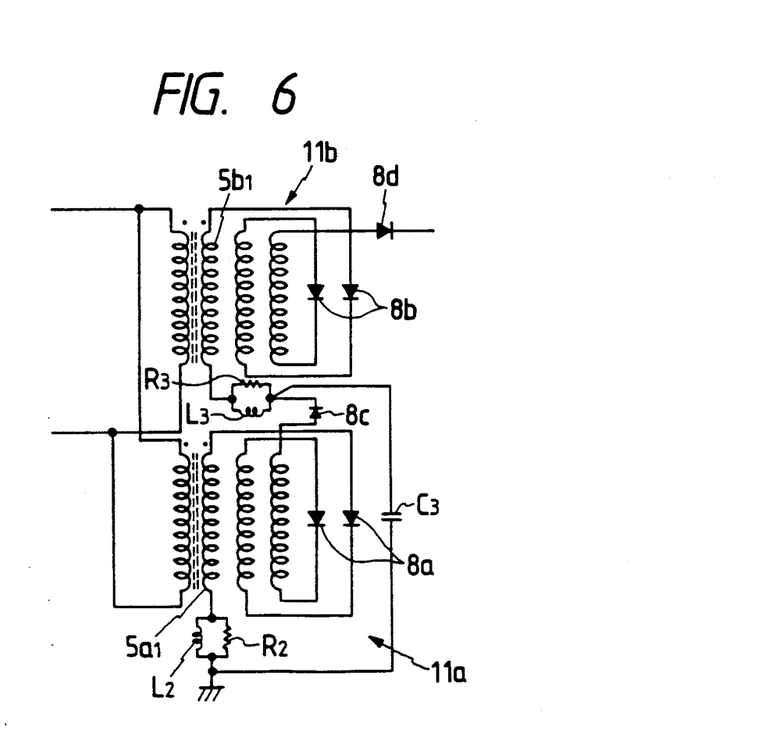

The flyback power supply in accordance with the fifth embodiment shown in FIG. 6 differs from the flyback power supply shown in FIG. 5 in that another parallel-connected circuit of a resistor R3 (which may have a resistance of 8.2 kΩ, for example) and an inductive element L3 (which may have an inductance of 2.7 mH, for example) is coupled in series to the input terminal of the innermost coil layer 5b1 of the high-voltage coil of the second coil unit 11b. The parallel-connected circuits are effective to reduce ringing in waveforms induced in the first and second coil units 11a, 11b. The capacitor C3 is shown as being connected to the grounded terminal of the parallel-connected circuit composed of the resistor R2 and the inductive element L2, but may be connected to the opposite terminal of this parallel-connected circuit.

Figure 7:
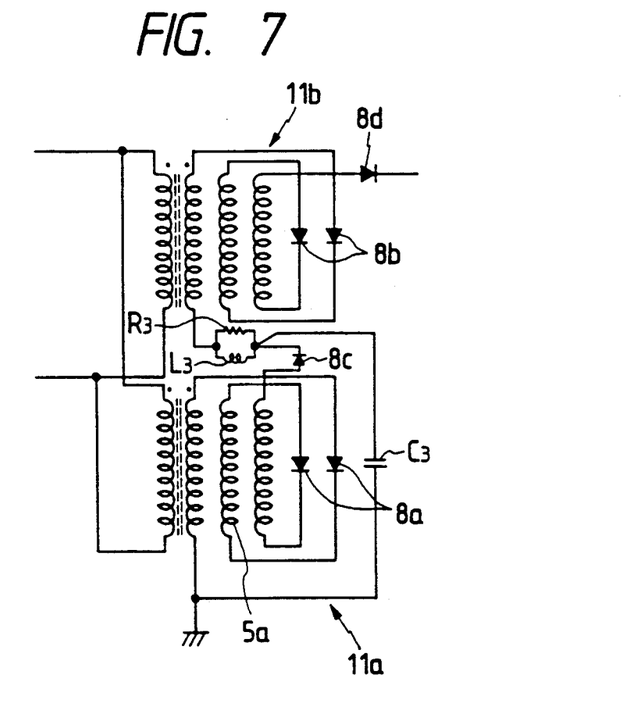

The flyback power supply according to the sixth embodiment shown in FIG. 7 is different from the flyback power supply shown in FIG. 6 in that the parallel-connected circuit composed of the resistor R2 and the inductive element L2 is dispensed with for a simpler circuit arrangement.

Figure 8:
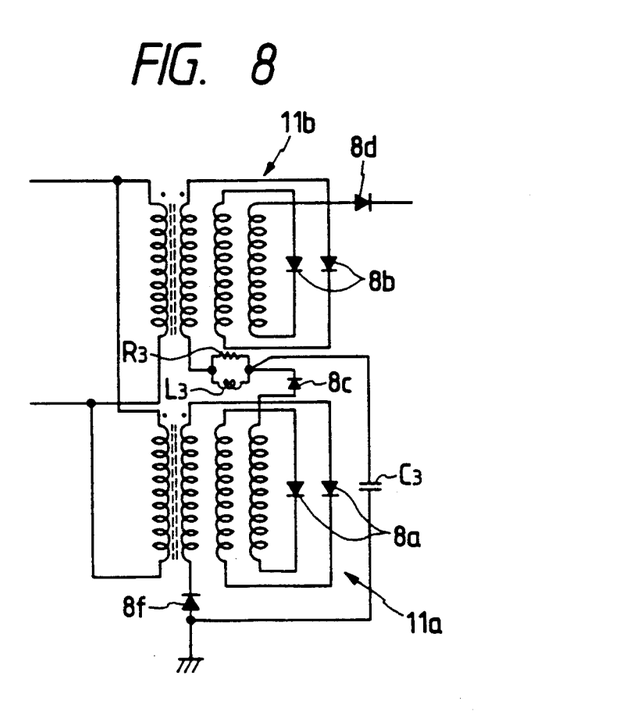

The flyback power supply according to the seventh embodiment shown in FIG. 8 is substantially the same as the flyback power supply shown in FIG. 7, except that a diode 8e is forward-connected between the innermost coil layer 5a1 of the high-voltage coil of the first coil unit 11a and the capacitor C3.

Figure 9:
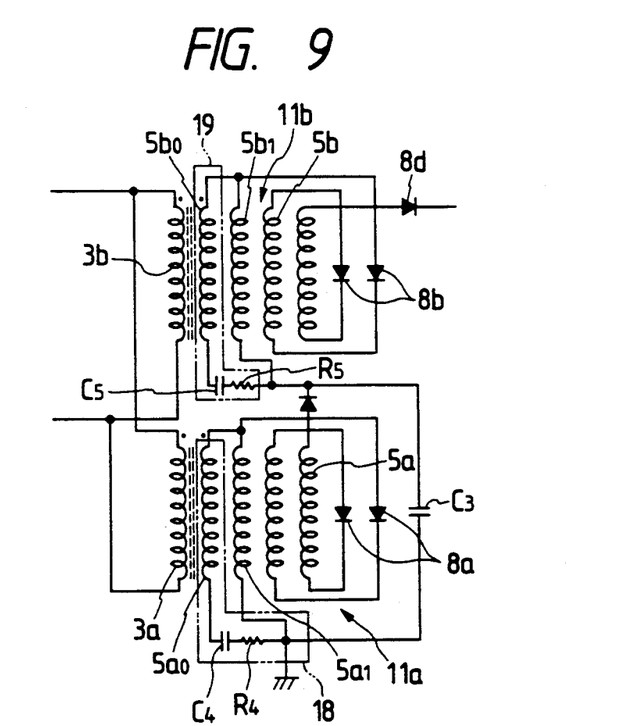

According to the eighth embodiment shown in FIG. 9, the flyback power supply includes, in addition to the flyback power supply shown in FIG. 2, a first ringing remover 18 comprising a coil layer 5a0, a capacitor C4, and a resistor R4 which are connected in series with each other, and coupled parallel to the innermost coil layer 5a1 of the first coil unit 11a, a second ringing remover 19 comprising a coil layer 5b0, a capacitor C5, and a resistor R5 which are connected in series with each other, and coupled parallel to the innermost coil layer 5b1 of the second coil unit 11b, and a capacitor C3 connected between the input terminals of the innermost coil layers 5a1, 5b1 of the first and second coil units 11a, 11b. The coil layer 5a0 is disposed between the low-voltage coil 3a and the innermost coil layer 5a1 of the first coil unit 11a, and the coil layer 5b0 is disposed between the low-voltage coil 3b and the innermost coil layer 5b1 of the second coil unit 11b. A ringing current in the first coil unit 11a flows through a closed circuit which comprises the coil layer 5a0, a distributed stray capacitance (not shown) between the coil layer 5a0 and the low-voltage coil 3a, the low-voltage coil 3a, an electrolytic capacitor (not shown) connected between the low-voltage coil 3a and ground, the resistor R4, and the capacitor C4. Therefore, the ringing current flowing through this closed circuit is dissipated as heat by the DC resistance of the closed circuit, with the result that no ringing is produced in the coil layers 5a of the first coil unit 11a. Similarly, a ringing current in the second coil unit 11b flows through a closed circuit which comprises the coil layer 5b0, a distributed stray capacitance (not shown) between the coil layer 5b0 and the low-voltage coil 3b, the low-voltage coil 3b, an electrolytic capacitor (not shown) connected between the low-voltage coil 3b and ground, the resistor R5, and the capacitor C5. Therefore, the ringing current flowing through this closed circuit is dissipated as heat by the DC resistance of the closed circuit, with the result that no ringing is produced in the coil layers 5b of the second coil unit 11b.

In each of the embodiments of the present invention, the outermost coil layer of each of the high-voltage coils of the first and second coil units 11a, 11b has a reduced diameter. Therefore, the material of the interlayer insulating layers 6a, 6b and the wires used as the high-voltage coils are reduced. Since the coil layers of the high-voltage coils of the first and second coil units 11a, 11b are reduced in number, the pressure applied to the interlayer insulating layers 6a, 6b and the coil layers 5a, 5b when they are wound is lowered, leaving appropriate gaps between the insulating layers 6a, 6b and the coil layers 5a, 5b, which can thus well be impregnated with the insulating resin bodies 13a, 13b. As a result, the flyback transformer which is highly reliable can easily be manufactured inexpensively. The flyback transformer radiates heat well as the first and second coil units 11a, 11b are disposed separately on the core legs 1a, 1b, respectively. Since any increase in the temperature of the flyback transformer is relatively low, the electric power which can be extracted from the flyback power supply is relatively large.

Figure 10:
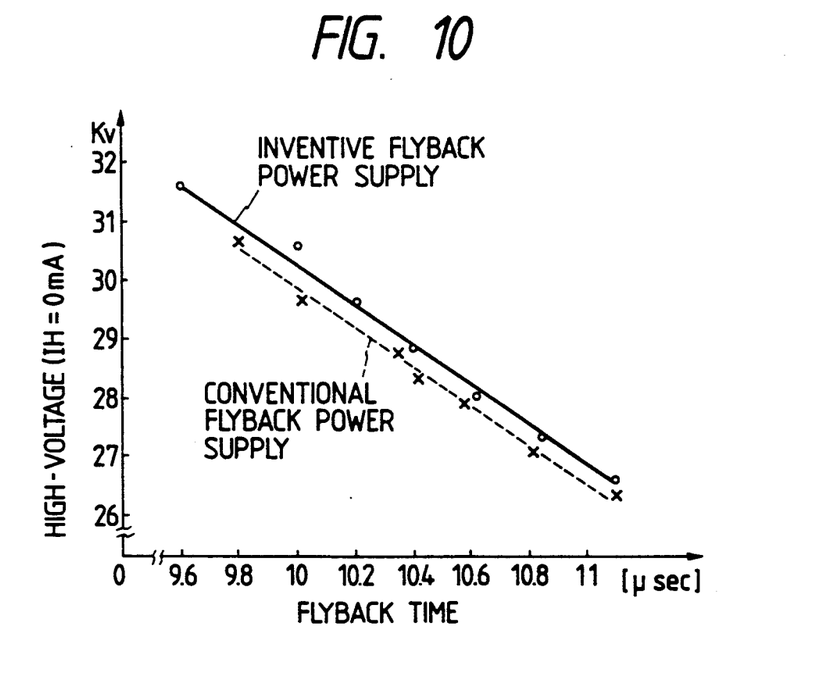
FIG. 10 is a graph showing the high-voltage vs. flyback-time characteristics of inventive and comparative flyback power supplies.
Figure 11:
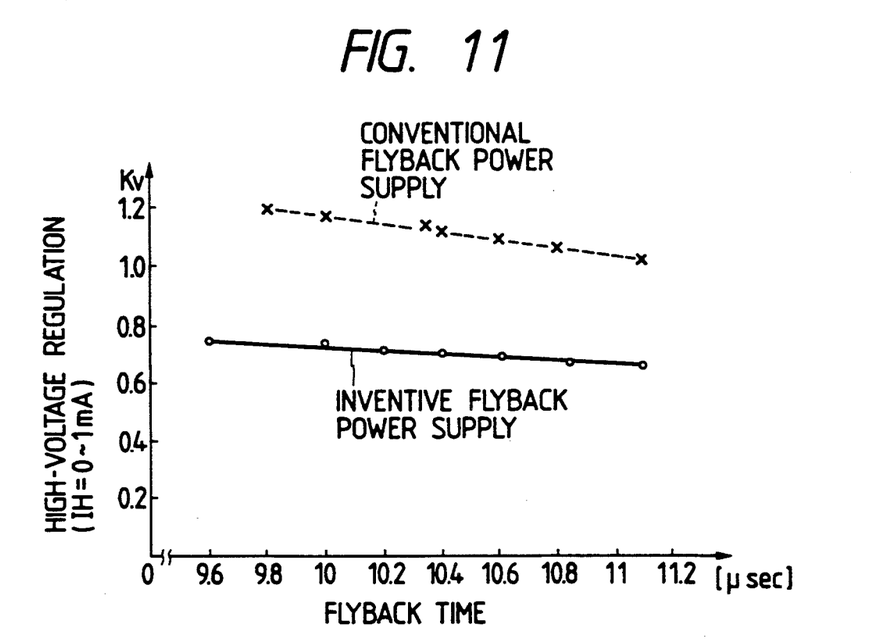
FIG. 11 is a graph showing the high-voltage-regulation vs. flyback-time characteristics of the inventive and comparative flyback power supplies.

FIGS. 10 and 11 show the high-voltage vs. flyback-time characteristics of inventive and conventional flyback power supplies, and the high-voltage-regulation vs. flyback-time characteristics of the inventive and conventional flyback power supplies. As shown in FIGS. 10 and 11, the inventive power supply has better high-voltage regulation than the conventional flyback power supply.

The coil layers 5a, 5b of the high-voltage coils of the first and second coil units 11a, 11b may not necessarily be connected to the respective diodes 8a, 8b successively from the innermost coil layers. However, it is advantageous to connect the coil layers 5a, 5b to the respective diodes 8a, 8b successively from the innermost coil layers since the potential difference between adjacent ones of the coil layers 5a, 5b is lower.

Although certain preferred embodiments have been shown and described, it should be understood that many changes and modifications may be made therein without departing from the scope of the appended claims.

What is claimed is:

1. A flyback power supply comprising: a flyback transformer comprising:
    a core having a plurality of core legs spaced from each other;
    a plurality of coil units supported respectively on said core legs; and
    each of said coil units including a low-voltage coil bobbin fitted over one of said core legs, a low-voltage coil wound around said low-voltage coil bobbin, a high-voltage coil bobbin disposed around said low-voltage coil bobbin, and a high-voltage coil which comprises a plurality of coil layers wound successively around said high-voltage coil bobbin with insulating layers interposed between said coil layers, the low-voltage coils of said coil units being connected parallel to each other;
    a plurality of first diodes connected in series with said coil layers, respectively, of said high-voltage coil of each of said coil units such that voltages produced across said coil layers will be in phase with each other;
    a second diode by which said high-voltage coils of said coil units are connected in series with each other, whereby voltages produced across said high-voltage coils are added and rectified;
    a parallel-connected circuit of a resistor and an inductive element, said parallel-connected circuit being connected to an input terminal of an innermost one of the coil layers of one of said coil units which is of a lower potential than the other coil units; and
    a capacitor connected between said input terminal and an input terminal of an innermost one of the coil layers of another of said coil units.

2. A flyback power supply comprising: a flyback transformer comprising:
    a core having a plurality of core legs spaced from each other;

a plurality of coil units supported respectively on said core legs; and each of said coil units including a low-voltage coil bobbin fitted over one of said core legs, a low-voltage coil wound around said low-voltage coil bobbin, a high-voltage coil bobbin disposed around said low-voltage coil bobbin, and a high-voltage coil which comprises a plurality of coil layers wound successively around said high-voltage coil bobbin with insulating layers interposed between said coil layers, the low-voltage coils of said coil units being connected parallel to each other;

a plurality of first diodes connected in series with said coil layers, respectively, of said high-voltage coil of each of said coil units such that voltages produced across said coil layers will be in phase with each other;

a second diode by which said high-voltage coils of said coil units are connected in series with each other, whereby voltages produced across said high-voltage coils are added and rectified;

a parallel-connected circuit of a resistor and an inductive element, said parallel-connected circuit being connected between said second diode and an input terminal of an innermost one of the coil layers of one of said coil units which is of a higher potential than the other coil unit; and a capacitor connected between said parallel-connected circuit and an input terminal of an innermost one of the coil layers of said other coil unit.

3. A flyback power supply according to claim 3, further including a second parallel-connected circuit of a resistor and an inductive element, said second parallel-connected circuit being connected between the input terminal of the innermost one of the coil layers of said other coil unit and said capacitor.

4. A flyback power supply according to claim 4, further including a third diode connected between the input terminal of the innermost one of the coil layers of said one coil unit and said capacitor, said third diode being connected forwardly with respect to said first diodes.

5. A flyback power supply comprising: a flyback transformer comprising:

a core having a plurality of core legs spaced from each other;

a plurality of coil units supported respectively on said core legs; and each of said coil units including a low-voltage coil bobbin fitted over one of said core legs, a low-voltage coil wound around said low-voltage coil bobbin, a high-voltage coil bobbin disposed around said low-voltage coil bobbin, and a high-voltage coil which comprises a plurality of coil layers wound successively around said high-voltage coil bobbin with insulating layers interposed between said coil layers, the low-voltage coils of said coil units being connected parallel to each other;

a plurality of first diodes connected in series with said coil layers, respectively, of said high-voltage coil of each of said coil units such that voltages produced across said coil layers will be in phase with each other;

a second diode by which said high-voltage coils of said coil units are connected in series with each other, whereby voltages produced across said high-voltage coils are added and rectified;

first and second ringing removing means each comprising a coil layer, a capacitor, and a resistor which are connected in series with each other, said first ringing removing means being connected parallel to an innermost one of the coil layers of one of said coil units which is of a lower potential than the other coil unit, said coil layer of said first ringing removing means being disposed between one of said low-voltage coils and said innermost coil layer of said one coil unit, said second ringing removing means being connected parallel to an innermost one of the coil layers of the other coil units, said coil layer of said second ringing removing means being disposed between the other low-voltage coil and said innermost coil layer of said other coil unit; and a capacitor connected between said first and second ringing removing means.

* * * * *